US008428977B1

(12) United States Patent
Luedtke

(10) Patent No.: US 8,428,977 B1
(45) Date of Patent: *Apr. 23, 2013

(54) METHOD AND APPARATUS FOR A LIFETIME SECURITY AND PROTECTION SCHEME

(76) Inventor: Timothy J. Luedtke, Berwyn, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/271,657

(22) Filed: Oct. 12, 2011

Related U.S. Application Data

(60) Continuation-in-part of application No. 12/787,393, filed on May 25, 2010, which is a division of application No. 10/359,348, filed on Feb. 5, 2003, now Pat. No. 7,739,131, application No. 13/271,657, which is a continuation-in-part of application No. 12/363,773, filed on Feb. 1, 2009, now Pat. No. 8,275,638, which is a continuation-in-part of application No. 10/359,348, filed on Feb. 5, 2003, now Pat. No. 7,739,131.

(60) Provisional application No. 60/404,106, filed on Aug. 16, 2002, provisional application No. 61/531,605, filed on Sep. 6, 2011, provisional application No. 61/025,707, filed on Feb. 1, 2008.

(51) Int. Cl.
*G06Q 40/00* (2012.01)

(52) U.S. Cl.
USPC ............................ 705/4; 705/2; 705/3; 705/35

(58) Field of Classification Search .............. 705/1, 2–4, 705/26, 35
See application file for complete search history.

(56) References Cited

U.S. PATENT DOCUMENTS

| 6,041,313 | A | * | 3/2000 | Gilbert et al. | 705/36 R |
| 7,305,347 | B1 | * | 12/2007 | Joao | 705/4 |
| 7,739,131 | B1 | | 6/2010 | Luedtke | |
| 7,797,175 | B2 | | 9/2010 | Luedtke | |
| 8,060,384 | B2 | * | 11/2011 | Landry | 705/4 |
| 2008/0228659 | A1 | * | 9/2008 | Dearden et al. | 705/36 R |

OTHER PUBLICATIONS

Coleman, Dennis. "Planning Opportunities for Tax Effective Funding of Post-retirement Medical Benefits With a Profit Sharing Plan." 21 Tax Management Compensation Planning Journal No. 11 (1993), pp. 276-281.*
Timothy J Luedtke., PRO-U, Jun. 15, 2010, www.naviben.us (as private, password protected site), pp. 1-10.
Timothy J Luedtke, 4YEW, Jun. 15, 2010, www.4yew.us, pp. 1-5.

* cited by examiner

*Primary Examiner* — Michelle Le

(57) ABSTRACT

Method and apparatus to facilitate managing a lifetime security and protection scheme for one or more cooperative members and one or more health care providers; the apparatus controls a computer system with a processor programmed so as to facilitate managing a captive insurer arrangement where each cooperative member retains ownership in a separate and independent captive risk insurance pool from which each owner cooperative member acquires annuity income benefits, health insurance, or other security or protection insurance; where the system facilitates by providing payment calculations to be made from one cooperative member's captive risk insurance pool to another cooperative member's captive risk insurance pool or to the one or more health care providers to meet the value and purpose of the cooperating entity and provide each cooperative member with lifetime security and protection; and some of the output data includes the calculated payments.

20 Claims, 2 Drawing Sheets

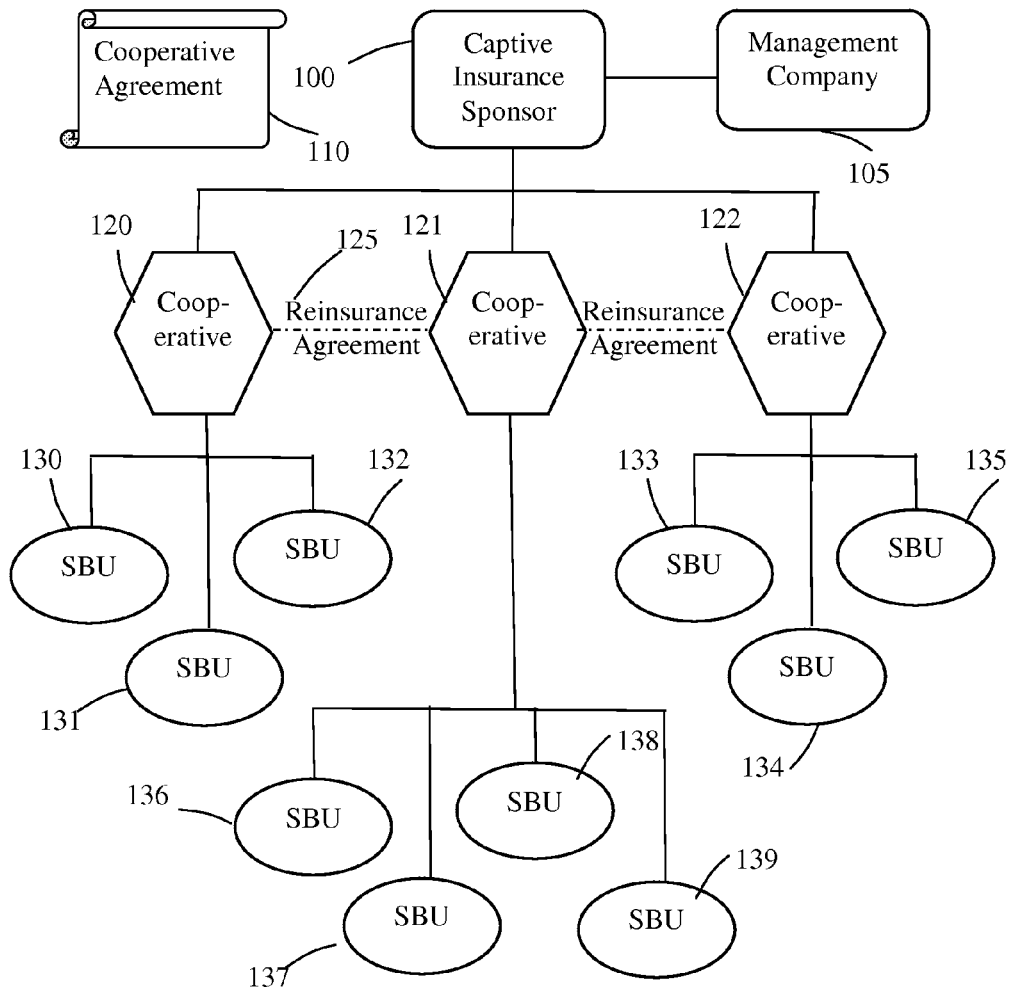

Fig. 1

Management Company – within this embodiment manages captive insurance sponsor

Captive Insurance Sponsor – within this embodiment created by steward sponsor

Cooperating Entities – within this embodiment each cooperating entity is a protected cell captive insurance company owned by its cooperative members who agree to the cooperative's sharing agreement (a cooperating entity may be an accountable care organization, an employer, a cooperative insurance company) – there could be more or less than the illustrated cooperating entities SBU – within this embodiment each small business unit is organized as a Series LLC captive and owned directly by each SBU owner (an SBU may be owned by a physician, an employee, an individual, or a family unit. Captive can be further used to enhance business risk management and as a mechanism for estate planning. Note there could be more or less than the illustrated number of SBUs shown for each cooperating entity

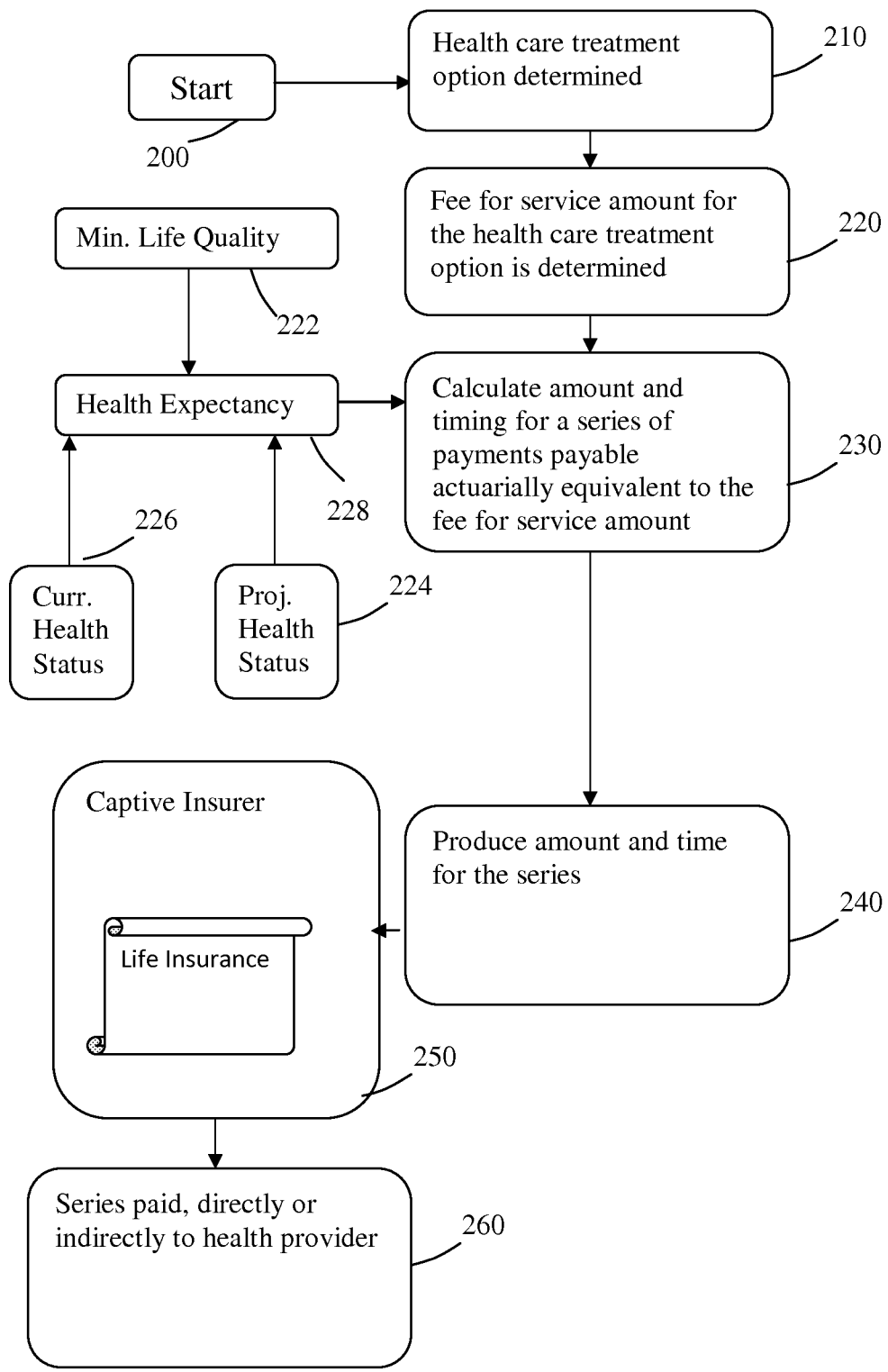

METHOD AND APPARATUS FOR A LIFETIME SECURITY AND PROTECTION SCHEME

CROSS-REFERENCE TO RELATED APPLICATION

This patent application is a continuation in part of U.S. patent application Ser. No. 12/787,393 filed May 25, 2010 entitled "Method and System for Providing, Administering, and Coordinating a Dual-Purpose Profit Sharing Plan" which is divisional of U.S. patent application Ser. No. 10/359,348 filed Feb. 5, 2003 issued as U.S. Pat. No. 7,739,131 on Jun. 15, 2010 entitled "Method and System for Implementing a Consumer-Driven Health Care Program for Employees" which claims the benefit of commonly-owned, co-pending U.S. Provisional Patent Application Ser. No. 60/404,106 filed Aug. 16, 2002 entitled "Method and System for Implementing A Profit-Sharing Plan Serving a Dual Purpose and Increasing the Effectiveness of Employer and Employee Contributions Made and Benefits Received", this patent application further claims the benefit of U.S. Provisional Patent Application Ser. No. 61/531,605 filed Sep. 6, 2011 entitled "Method and Apparatus for a Lifetime Security and Protection Scheme", the whole contents and disclosure of each of which are expressly incorporated by reference herein as if fully set forth herein. This patent application is additionally related to the following commonly-owned, co-pending United States patent applications, the entire contents and disclosure of each of which is expressly incorporated by reference herein as if fully set forth herein. A continuation in part of U.S. patent application Ser. No. 12/363,773, filed Feb. 1, 2009 entitled "Apparatus and Method for Creating a Retirement Medical Program through a Profit Sharing Plan and a Pension Plan Retiree Health Account" claiming the benefit of U.S. Provisional Patent Application Ser. No. 61/025,707 filed Feb. 1, 2008 entitled "Method and System for Creating a Retirement Medical Program through a Profit Sharing Plan and a 401(h) Pension Plan" which is a continuation-in-part of U.S. patent application Ser. No. 10/359,348 filed as Feb. 5, 2003 issuing as U.S. Pat. No. 7,739,131 on Jun. 15, 2010 entitled "Method and System for Implementing a Consumer-Driven Health Care Program for Employees" which claims the benefit of commonly-owned, co-pending U.S. Provisional Patent Application Ser. No. 60/404,106 filed Aug. 16, 2002 entitled "Method and System for Implementing A Profit-Sharing Plan Serving a Dual Purpose and Increasing the Effectiveness of Employer and Employee Contributions Made and Benefits Received".

COPYRIGHT NOTICE

This document contains material that is subject to copyright protection. The copyright owner has no objection to a statutory fair use of this material, as it appears in the files or records of the U.S. Patent and Trademark Office, but otherwise reserves all copyright rights whatsoever.

FIELD OF THE INVENTION

The technical field is computers and data processing systems. Depending on the implementation, there is apparatus and corresponding products produced thereby, as well as data structures, computer-readable media tangibly embodying program instructions, manufactures, and necessary intermediates of the foregoing, each pertaining to digital aspects of wide area network communications. Embodiments can have utility in such areas as security and protection schemes, retiree income and health benefit plans, defined benefit pension plans containing a retiree health account in tandem with a Dual-Purpose Profit Sharing benefit plan (DPPSP) to employees, and the like.

The objective of this patent is to create a lifetime security and protection scheme based upon the teaching of Jesus in John 15:12-17 ("This is my commandment: love one another as I love you. No one has greater love than this, to lay down one's life for one's friends. You are my friends if you do what I command you. I no longer call you slaves, because a slave does not know what his master is doing. I have called you friends, because I have told you everything I have heard from my Father. It was not you who chose me, but I who chose you and appointed you to go and bear fruit that will remain, so that whatever you ask the Father in my name he may give you. This I command you: love one another.").

SUMMARY OF INVENTION

In the description herein, various aspects of embodiments have been described. For purposes of explanation, specific numbers, systems and configurations were set forth in order to provide a thorough understanding of the embodiments. However, it is apparent to one skilled in the art having the benefit of this disclosure that the embodiments may be practiced without the specific details. In other instances, well-known features were omitted or simplified in order not to obscure the embodiments.

For purposes of this document, the lifetime security and protection scheme that is an embodiment will be known as the 4YEW$^{SM}$ Plan. Possible applications of this invention and the 4YEW$^{SM}$ Plan would be for retiree health care, prescription drug needs, medical claims under workers' compensation, pre-funding health care needs, funding Part B, Part C, and Part D Medicare premiums, paying for long-term care, paying end-of-life health costs, pre-funding injury and sickness benefits, prefunding unemployment payments, making charitable contributions (including the enablement of a regular tithing program to a church), funding an educational enrichment program, coordinating state- and federal-welfare benefits, reducing insurance costs for property and casualty coverages (e.g. homeowners, auto, umbrella), and the like.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a combination of a dual purpose profit sharing plan, and a pension plan or annuity. Such pension plan or annuity may have a separate account providing health benefits.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a combination of a dual purpose profit sharing plan, pension plan or annuity, and a captive insurance arrangement. Such pension plan or annuity may have a separate account providing health benefits.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a combination of a dual purpose profit sharing plan, pension plan or annuity, and a captive insurance arrangement for a cooperating entity. Such pension plan or annuity may have a separate account providing health benefits.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a cooperative member's dual purpose profit sharing plan and the cooperative member's pension or annuity (the pension or annuity having a separate account for health benefits) for a cooperating entity, such entity to be a church.

According to an embodiment, there can be a method of using an apparatus, the method including the steps of: controlling a computer system comprising a digital computer processor to process input data into output data, the processor in communication with an input device to receive the input data and to an output device to output the output data, said processor programmed so as to facilitate managing a captive insurer arrangement where each cooperative member retains ownership in a separate and independent captive risk insurance pool from which each owner cooperative member acquires annuity income benefits, health insurance, or other security or protection insurance; where the programmed processor calculates any payments required to be made from one cooperative member's captive risk insurance pool to another cooperative member's captive risk insurance pool to meet the value and purpose of the cooperating entity and provide each cooperative member with lifetime security and protection; and some of the output data includes the payments payable from and to each captive risk insurance pool.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a captive insurer arrangement where each cooperative member retains ownership in a separate and independent captive risk insurance pool from which each owner cooperative member acquires annuity income benefits, health insurance, or other security or protection insurance; where the programmed processor calculates any payments required to be made from one cooperative member's captive risk insurance pool to another cooperative member's captive risk insurance pool to meet the value and purpose of the cooperating entity and provide each cooperative member with lifetime security and protection; and some of the output data includes the payments payable from and to each captive risk insurance pool.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a combination of a dual purpose profit sharing plan, pension plan, and a captive insurance arrangement for a cooperating entity, such entity to consist of one or more individuals each agreeing to a mutually beneficial cooperation agreement.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a combination of a dual purpose profit sharing plan, pension plan, and a captive insurance arrangement for a cooperating entity, such entity to consist of one or more individuals where each individual agrees to a mutually beneficial cooperation agreement where life insurance exists on each of the one or more individuals.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a combination of a dual purpose profit sharing plan, pension plan, and a captive insurance arrangement for a church, such church to consist of one or more individuals where each individual agrees to a mutually beneficial cooperation agreement where life insurance exists on each of the one or more individuals.

According to an embodiment, there is an apparatus, the apparatus: controls a computer system comprising a digital computer processor to process input data into output data, the processor in communication with an input device to receive the input data and to an output device to output the output data, said processor programmed so as to facilitate managing a cooperative member's dual purpose profit sharing plan and the cooperative member's pension or annuity (the pension or annuity having a separate account for health benefits) for a cooperating entity, such entity to be a church. Each of the cooperative members will have life insurance on their life to provide for the value and purpose of the cooperating entity.

According to an embodiment, there is an apparatus, the apparatus: controls a computer system comprising a digital computer processor to process input data into output data, the processor in communication with an input device to receive the input data and to an output device to output the output data, said processor programmed so as to calculate the actuarially equivalent periodic benefit for a pension or an annuity, the pension or annuity having a health account, for a cooperative member of a church where such actuarially equivalent periodic benefit is determined from contributions from a dual purpose profit sharing plan of the cooperative member.

According to an embodiment, there is an apparatus, the apparatus: controls a computer system comprising a digital computer processor to process input data into output data, the processor in communication with an input device to receive the input data and to an output device to output the output data, said processor programmed so as to calculate an actuarially equivalent benefit for an amount certain to a health provider for health services to be performed on the life of a natural person where such actuarially equivalent periodic benefit is payable on the adjusted mortality expectations for the natural person assuming the health service is performed. The actuarially equivalent benefit to be paid (either directly or indirectly) to the benefit of the health provider after completion of such health services and only if the natural person is living. Such actuarially equivalent benefit may be determined either as a lump sum amount or as a series of periodic amounts payable at specified times in the future.

According to an embodiment, there is an apparatus, the apparatus: controls a computer system comprising a digital computer processor to process input data into output data, the processor in communication with an input device to receive the input data and to an output device to output the output data, said processor programmed so as to calculate an actuarially equivalent benefit for an amount certain to a health provider for health services to be performed on the life of a natural person where such actuarially equivalent periodic benefit is payable on the adjusted mortality expectations for the natural person assuming the health service is performed. The actuarially equivalent benefit to be paid to a captive insurance risk pool owned by the health provider after completion of such health services and only if the natural person is living. Such actuarially equivalent benefit may be determined either as a lump sum amount or as a series of periodic amounts payable at specified times in the future.

Another embodiment, there can be a computer-implemented system for managing a lifetime security and protection scheme wherein said system comprises: controlling a computer system comprising a digital computer processor to process input data into output data, the processor in communication with an input device to receive the input data and to an output device to output the output data, processor programmed to facilitate the calculation of tax liability amounts under any Federal, State, or local law, or the law of any foreign, jurisdiction, including any statute, rule regulation or ordinance that levies, imposes, or assesses such tax liability so as to prepare tax documentation for the dual purpose profit sharing plan, pension plan, and the captive insurer and the tax-paying beneficiaries of such dual purpose profit sharing plan, pension plan, and captive insurer.

Another embodiment, there can be a computer-implemented system for managing a combination of a dual purpose profit sharing plan, a pension plan, and a captive insurance program wherein said system comprises: controlling a computer system comprising a digital computer processor to process input data into output data, the processor in communication with an input device to receive the input data and to an output device to output the output data, processor programmed to facilitate the calculation of tax liability amounts under any Federal, State, or local law, or the law of any foreign, jurisdiction, including any statute, rule regulation or ordinance that levies, imposes, or assesses such tax liability so as to prepare tax documentation for the dual purpose profit sharing plan, pension plan, and the captive insurer and the tax-paying beneficiaries of such dual purpose profit sharing plan, pension plan, and captive insurer.

Other aspects of the invention can improve the performance of a DBk plan; protect beneficiary interests in a profit sharing plan, a VEBA, or a pension plan through purchase of a captive insurance policy where the captive insurance policy is issued by a beneficiary-owned captive insurer; reduce fiduciary conflicts where multiple plan beneficiaries exist; provide internal liquidity between cooperative members so as to avoid liquidity crisis; and provide the risk transfer framework for health care provider-owned accountable care organizations, patient-centered medical homes, health maintenance organization, or other health care providing organization where the provider owns a captive insurer.

In sum, appreciation is requested for the range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, those skilled in the art will readily appreciate that many modifications are possible in the exemplary embodiments without materially departing from the novel teachings and advantages herein. Accordingly, all such modifications are intended to be included within the scope defined by claims. Means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

BRIEF DESCRIPTION OF THE DRAWINGS

The accompanying drawings provide embodiments of the present invention. It is emphasized that, according to common practice, the various features of the drawing are not to scale. On the contrary, the dimensions of the various features are arbitrarily expanded or reduced for clarity.

FIG. 1 is an illustration of an exemplary embodiment of the present invention; and FIG. 2 is an illustration of an exemplary embodiment.

DETAILED DESCRIPTION

The exemplary embodiment descriptions outlined herein may be converted to program code by those knowledgeable in the art and executed on a computer or a network of computers to administer a lifetime security and protection scheme providing retirement, health, accident and other security benefits. Other security benefits may include, but are not limited to, unemployment compensation, charity and welfare benefits. Health and accident benefits may include, but are not limited to, medical (including medical benefits payable under COBRA or workers' compensation), dental, vision, pharmacy benefits, long-term care, mental health, and life insurance. For purposes of an embodiment of the present invention, health and accident benefits will also be called incidental or ancillary benefits as applicable—consistent with Internal Revenue Service usage.

Embodiments may be implemented in hardware or software, or a combination of both. However, embodiments may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor or processors, or the like, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality, and in some embodiments (depending on context herein) computer systems can overlap. As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality, and in some embodiments (depending on context herein) computer systems can overlap. Logic flow can represent signal processing, such as digital data processing, communication, or as evident from the context hereinafter. Logic flow can be implemented in discrete circuits, programmed computer, or the equivalent. Computer-readable media, as used herein can comprise at least one of a RAM, a ROM, A disk, an ASIC, and a PROM.

A cooperating entity, or its administrator, uses an embodiment of the apparatus to facilitate managing a lifetime security and protection scheme for the one or more cooperative members and any member protectorate (e.g., spouse, dependent, family member, designated support person). A cooperating entity, organized under applicable law, may be a church or any affiliation of members sharing value and purpose where the church or affiliation is able to receive charitable contributions and to offer a combination of a profit sharing and a pension plan, such pension plan to provide both retirement annuities and health benefits. The value and purpose is to meet one or more of lessening the burdens of government, poverty relief, education, religious, health, or other charitable objectives of the cooperating entity. The cooperating entity may require a cooperation agreement, a version to which each member submits and agrees. Some possible elements of the cooperation agreement would outline cooperative member commitment to support the cooperating entity by designating the cooperating entity as beneficiary on insurance, retirement or other benefit plan, employment arrangement for the cooperative member to support the cooperating entity value and purpose should the cooperative member become unemployed prior to retirement, cooperative member end of life wishes for care and support, or support for the cooperative member and any member protectorate should there be need per the cooperating entity value and purpose.

An embodiment of the apparatus facilitates the cooperating entity or an administrator on the cooperating entity's behalf the measurement of the financial position for each cooperative member and the aggregate financial position for all cooperative members. The financial position is the difference between the calculated value for all positive monetary positions designated to benefit a cooperative member less the actuarially determined anticipated outflows to meet the security and protection requirements for the cooperative member. The aggregate financial position is the accumulation of the cooperative member financial positions for all cooperative members. Each cooperative member's positive monetary position to be held in at least one of a dual purpose profit sharing plan, qualified trust, or a captive insurance company.

A further embodiment of the apparatus, has the processor calculate one or more current period sharing amounts to be transferred from one cooperative member to another. The calculated one or more sharing amounts facilitates the cooperating entity meeting the entity's value and purpose: to meet one or more of lessening the burdens of government, poverty relief, education, religious, health, or other charitable objectives of the cooperating entity. Where the cooperative entity's value and purpose lessens the burdens of government, apparatus output will include any required documentation to the government for payment of any government transfer payment due the cooperating entity.

A further embodiment of the apparatus includes facilitating and management of a mufti-level marketing system to expand the reach of the cooperating entity and further the value and purpose. The mufti-level marketing system provides shared incentives for cooperative members to extend the cooperating entity reach through attracting new member-selected cooperative members. The processor is programmed to calculate an incentive reward for existing cooperative members which attract new cooperative members that share the cooperating entity's value and purpose.

FIG. 2 shows a further embodiment. For each cooperative member having a health care service performed, Step 210, a programmed assessment is made of the anticipated mortality expectations for the cooperative member, Step 228, under a projected health status, Step 224. Such projected health status to assume that the health care service is performed. The health status, Step 226, of the cooperative member before the service is provided is an input into the determination of the mortality expectation. A processor is programmed to implement methodologies commonly used by and familiar to actuaries or those trained in the art. The programmed processor calculates a series, Step 230, consisting of at least one compensation fee amount, that would be actuarially equivalent to an amount certain that the health provider (hospital, doctor, nurse, or other health care practitioner) would receive for providing the health care service (often called the fee for service amount, Step 220), such amount certain to be received irrespective of whether the cooperative member lives (or necessarily is in good health) beyond the execution of the health care service.

The actuarially equivalent series is to be paid after completion of such health service and only if the member is living, Step 260. Such actuarially equivalent amount is output, Step 240, and may be determined either as a lump sum amount or as a series of periodic amounts payable at specified times in the future. As a further embodiment, the projection assumptions (also known as mortality assumptions) entering the actuarial equivalence calculations could incorporate additional criteria requiring that the member meet certain minimum life quality requirements (e.g. not in a coma, able to perform at least a number of activities of daily living), Step 222. Under the further embodiment the actuarially equivalent series is to be paid after completion of such health service and only if the member meets the minimum life quality requirement. By aligning the health provider and the cooperative member interests, the health provider becomes an effective fiduciary for the cooperative member.

An alternative embodiment to FIG. 2 would have the projected health status assume that the health care service is not performed where foregoing the health care service provides the cooperative member improved life quality.

Another specified embodiment of this invention would be where a steward sponsor establishes under applicable state, local, or federal law a cooperating entity that includes one or more participating cooperative members. FIG. 1 illustrates an embodiment of a risk transfer framework for one or more accountable care organizations. A cooperative, Step 120, is filed as an accountable care organization (ACO).

Another specified embodiment of this invention would be where a steward sponsor establishes under applicable state, local, or federal law a cooperating entity that is a church that includes one or more participating cooperative members. Each of the one or more participating cooperative members agrees to work to meet one or more of lessening the burdens of government, poverty relief, educational, religious, health, or other charitable objectives of the cooperating entity. Such objectives are outlined in a cooperation agreement. The cooperation agreement will provide that each cooperative member will be employed by the cooperating entity if the cooperative member becomes unemployed with the cooperating entity meeting the responsibilities as an employer. These responsibilities include being the employer of record for tax purposes, filing paperwork, being the human resource manager, providing employee benefits, providing workers' compensation benefits, providing payroll services, and meeting any welfare or unemployment needs for each cooperative member. Such cooperating entity will define for or mutually agree with the cooperative member specific work objectives and associated results that further the value and purpose of the cooperating entity.

The cooperating entity will establish a combination of a dual purpose profit sharing plan and a pension plan arrangement for the benefit of the one or more cooperative members employed by the cooperating entity. The cooperating entity may accept rollovers of existing amounts into the respective dual purpose profit sharing plan. The cooperating entity may also accept as a transfer from an outside organization a liability to a participating cooperative member. The cooperating entity may also establish a captive insurer that will provide annuities and health insurance for cooperative members who are not or have not been employed by the cooperating entity.

Each of the cooperative members to have listed the cooperating entity as beneficiary on profit sharing or life insurance arrangements in in furtherance of the cooperating entity's value and purpose to provide lifetime security and protection.

Each of the cooperative members to have listed the cooperating entity as beneficiary on profit sharing or life insurance arrangements in furtherance of the cooperating entity's value and purpose to provide lifetime security and protection.

What is claimed is:

1. A method of using an apparatus, the method including the steps of:
controlling a computer system comprising a digital computer processor to process input data into output data, the processor in communication with an input device, to receive the input data, and to an output device, to output the output data, said processor programmed so as to facilitate managing a lifetime security and protection scheme where such scheme is implemented by a cooperating entity to enable the use of a dual purpose profit sharing plan cooperating with a pension plan such that money in the dual purpose profit sharing plan funds lifetime benefits for a cooperative member and a sharing arrangement outlined in a mutually beneficial cooperation agreement such arrangement to include an agreement for life insurance on the cooperative member's life to provide the cooperative member with lifetime security and protection, by operations including:
receiving, as some of the input data at the input device, the value in an account of the dual purpose profit sharing plan for the support of retirement income and the value in another account of the dual purpose profit sharing plan for the support of health care;
receiving, as some of the input data at the input device, demographic, health status, and payout selections for the cooperative member;
receiving, as some of the input data at the input device, risk factors to provide security and protection preretirement to cover one or more risks such as death, disability, or hardship;
calculating a lifetime retirement income amount and a pension health account amount from the input data that is provided by the cooperating entity;
producing, as some of said output data at said output device, the lifetime retirement income amount and the pension health account amount.

2. The method of claim 1, wherein the cooperating entity is a church.

3. The method of claim 1, wherein the cooperative member purchases an annuity from a captive insurer using money in profit sharing plan while still employed by another employer.

4. The method of claim 3, wherein the captive insurer is owned by the cooperating entity.

5. The method of claim 3, wherein the captive insurer is owned by the cooperative member.

6. The method of claim 1, wherein the cooperative member purchases a health insurance product from a captive insurer using money in profit sharing plan while still employed by another employer.

7. The method of claim 6, wherein the captive insurer is owned by the cooperating entity.

8. The method of claim 6, wherein the captive insurer is owned by the cooperative member.

9. Apparatus to facilitate managing a dual purpose profit sharing plan cooperating with a pension plan as a lifetime security and protection scheme, the apparatus including:
a computer system comprising a digital computer processor to process input data into output data, the processor in communication with an input device, to receive the input data, and to an output device, to output the output data, said processor programmed so as to facilitate managing a lifetime security and protection scheme where such scheme is implemented by a cooperating entity to enable the use of a dual purpose profit sharing plan cooperating with a pension plan such that money in the dual purpose profit sharing plan funds lifetime benefits for a cooperative member and a sharing arrangement provides the cooperative member with lifetime security and protection, by operations including:
receiving, as some of the input data at the input device, the value in an account of the dual purpose profit sharing plan for the support of retirement income and the value in another account of the dual purpose profit sharing plan for the support of health care;

receiving, as some of the input data at the input device, demographic, health status, and payout selections for the cooperative member;

receiving, as some of the input data at the input device, risk factors to provide security and protection preretirement to cover one or more risks such as death, disability, or hardship;

calculating a lifetime retirement income amount and a pension health account amount from the input data that is provided by the cooperating entity;

producing, as some of said output data at said output device, the lifetime retirement income amount and the pension health account amount.

10. The apparatus according to claim 9, wherein some of the output data at said output device is a calculated cooperating entity risk reduction credit from execution of a multi-level marketing program.

11. An apparatus comprising:

a computer system comprising a digital computer processor comprising a capability of transforming input data into output data, the processor in communication with an input device, to receive the input data, and to an output device, to output the output data, said processor programmed as means for aligning fiduciary relationships for one or more health care providers with the plan beneficiary of a dual purpose profit sharing or pension plan, by said transforming, the programmed processor takes as input data cooperative member demographic, pre-service health status, and other actuarial data to recalculate an input health care provider fee charge into an actuarially equivalent adjusted series of one or more health care provider fees that are payable to the provider at one or more dates subsequent to the cooperative member receiving the provider service, surviving to the payout date, and meeting a minimum life quality requirement;

and outputting, as some of said output data at said output device, the one or more health care provider fees and the one or more dates for the actuarially equivalent adjusted series.

12. Apparatus to facilitate managing a captive insurance program to provide cooperative members with a lifetime security and protection scheme, the apparatus: controls a computer system comprising a digital computer processor to process input data into output data, the processor in communication with an input device to receive the input data and to an output device to output the output data, said processor programmed so as to facilitate managing a captive insurer arrangement where each cooperative member retains ownership in a separate and independent captive risk insurance pool from which each owner cooperative member acquires annuity income benefits, health insurance, or other security or protection insurance; where the programmed processor calculates any payments required to be made from one cooperative member's captive risk insurance pool to another cooperative member's captive risk insurance pool to meet the value and purpose of the cooperating entity and provide each cooperative member with lifetime security and protection; and the payments payable from and to each captive risk insurance pool is output to the output device.

13. The apparatus according to claim 12, wherein apparatus implements enterprise risk management best practices to limit failure risk.

14. A method of using an apparatus, the method including the steps of:

controlling a computer system comprising a digital computer processor to process input data into output data, the processor in communication with an input device, to receive the input data, and to an output device, to output the output data, said processor programmed so as to facilitate managing a dual purpose profit sharing plan cooperating with an accountable care organization where money in a cooperative member's incidental account of a dual purpose profit sharing plan purchases life insurance with such insurance provided as collateral to an accountable care organization, by operations including:

receiving, as some of the input data at the input device, a health care treatment plan option, a fee for service amount payable for the treatment option and a projected health status;

calculating projected assumptions for the projected health status;

under the projected assumptions calculating a series, consisting of at least one compensation fee amount, that is actuarially equivalent to the received fee for service amount;

producing, as some of said output data at said output device, the series.

15. The method of claim 14, wherein the projected assumptions are for while the projected health status is "living".

16. The method of claim 14, wherein the projected assumptions are for while the projected health status "meets certain minimum life quality requirements".

17. The method of claim 14, wherein the accountable care organization is a captive insurer.

18. The method of claim 17, wherein the captive insurer is a protected cell captive.

19. The method of claim 17, wherein the providers participating in the accountable care organization participate through a provider-owned captive.

20. The method of claim 19, wherein the provider-owned captive is structured as a Series LLC.

* * * * *